United States Patent [19]
Woodard

[11] 3,804,370
[45] Apr. 16, 1974

[54] RECIPROCATING PULLEY DRUM CABLE DRIVE
[76] Inventor: Boyd Ray Woodard, 6995 N. W. 32nd Ave., Miami, Fla.
[22] Filed: Apr. 26, 1973
[21] Appl. No.: 354,899

[52] U.S. Cl............. 254/150 R, 74/89.22, 74/424.8, 242/157.1, 254/175.3, 254/186 R
[51] Int. Cl........................... B66d 1/39, B66d 1/36
[58] Field of Search.......... 254/150 R, 175.3, 175.5, 254/175.7, 168, 186 R, DIG. 11; 74/424.8, 89.22; 242/157.1, 158.2, 158.4

[56] References Cited
UNITED STATES PATENTS
3,329,406  7/1967  Flair.............................. 254/186 R
3,048,370  8/1962  Kratzer .......................... 254/150 R FOREIGN PATENTS OR APPLICATIONS
247,488  4/1969  U.S.S.R....................... 254/DIG. 11

Primary Examiner—Richard E. Aegerter
Assistant Examiner—Jeffrey Nase

[57] ABSTRACT

A screw threaded reciprocating cable drive means comprised of an elongated, screw threaded pulley drum, fixed to a drive shaft, connected to a reversible motor means by a telescopic coupling. A nut, fixed relative to a frame, is carried on the screw threaded drum whereby reciprocating movement is imparted to the drum when the motor means is alternately energized in forward and reverse directions. Cable means engaged in the screw threads of the drum are driven thereby without traveling with the drum.

7 Claims, 2 Drawing Figures

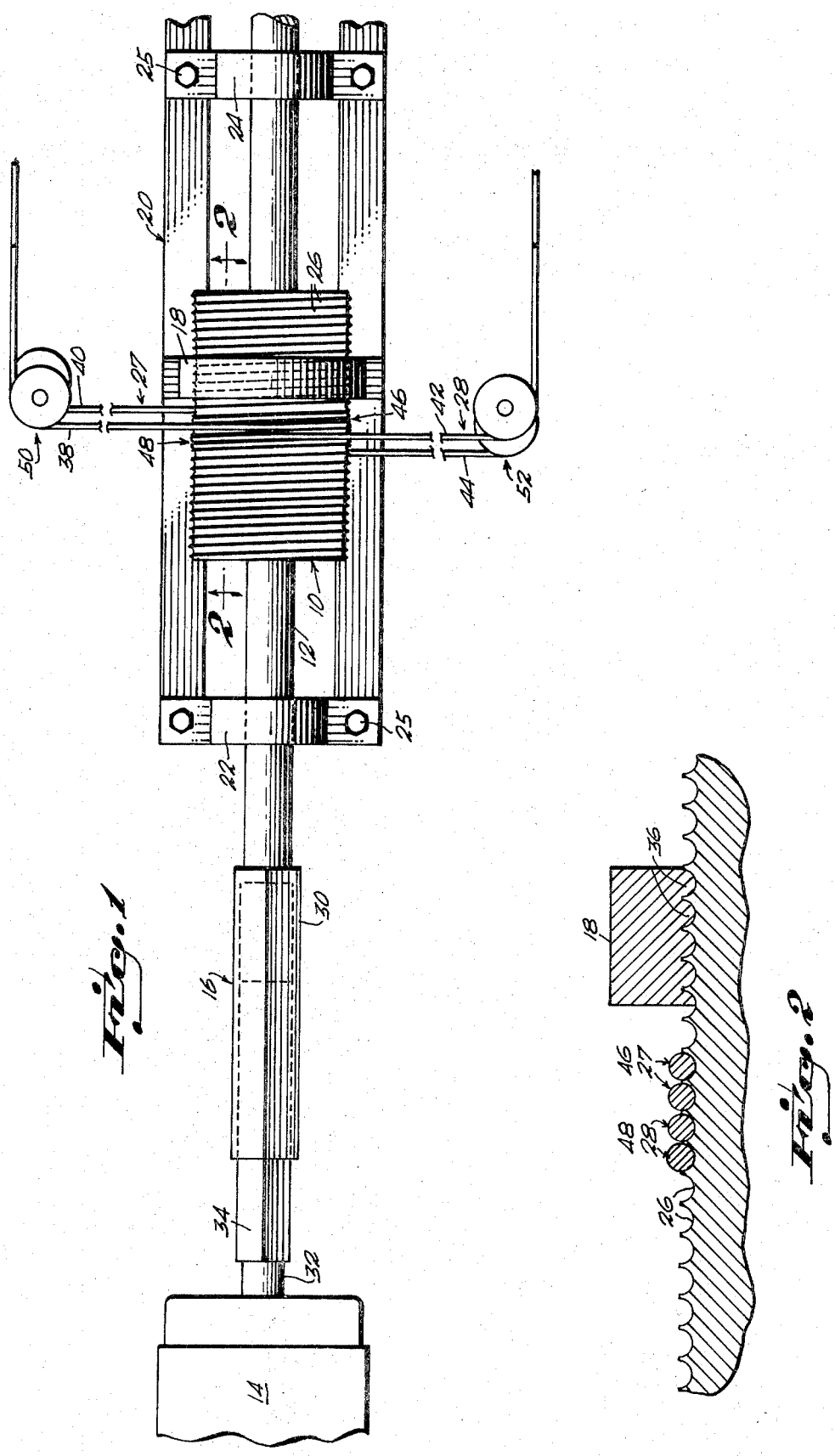

RECIPROCATING PULLEY DRUM CABLE DRIVE

BACKGROUND OF THE PRESENT INVENTION

Many devices and structures are driven or moved by cable drive means. Such devices or structures often require a double cable drive, for example, one drive to each side thereof. In such cases, it is imperative that the two cable drives be perfectly synchronized. In the event that one side gets slightly ahead of or behind the other side, the device or structure may cock or bind causing it to jamb.

One general type of structure which may utilize such a cable drive is a stacked or telescopic cover housing which may be made in a plurality of sections for movement between extended or closed, and telescoped or open positions relative to an object or structure associated therewith.

In this type of structure, one run of each cable is attached to opposite sides of one of the stacked or telescopic sections in a manner so as to move the plurality of sections to the extended, closed position; the other run of each cable is likewie fixed to another of said sections to move the plurality of sections to the telescoped or open position.

To achieve sufficient purchase on the pulley drive means, each cable must be provided with at least 1½ turns thereabout. With conventional pulleys, commonly in use, the cables at times tend to travel, slip or shift somewhat on the pulleys, during operation, resulting in loss of the proper synchronization required to prevent jamming.

OBJECTS AND ADVANTAGES OF THE PRESENT INVENTION

The present invention pertains to a screw threaded pulley drum cable drive means which maintains positive positioning and control of the cable means which is passed at least 1½ turns thereabout in engagement in the thread.

It is therefore one of the principal objects of the present invention to provide such a cable drive means incorporating an elongated, screw threaded drum, fixed to a drive shaft which is connected to a reversible motor means by a telescopic coupling, a nut, fixed relative to a frame, being carried on the screw threaded drum whereby reciprocating movement is imparted to the drum when the motor means is alternately energized in forward and reverse directions.

Another object of the instant invention is to provide a drive means for two or more cables, engaged thereabout, in substantially perfect synchronization.

Another object of this invention is to provide such a cable drive means which may be used in combination with conventional pulley means to direct the cable runs, extending therefrom, in any desired direction for attachment to the object or device which it is intended to move or drive.

BRIEF DESCRIPTION OF THE DRAWINGS

FIG. 1 is a top plan view of the screw threaded pulley drum cable drive means in accordance with the present invention; and FIG 2 is a fragmentary, enlarged sectional view taken along the line 2—2 of FIG. 1.

DETAILED DESCRIPTION OF THE DRAWINGS

With reference to the drawings in which like reference numerals designate like or corresponding parts throughout the two views, and with particular reference to FIG. 1, the device of the present invention is comprised of a screw threaded pulley drum 10 fixed by any conventional means to a drive shaft 12, connected to a reversible motor 14 by a telescopic coupling 16. A nut 18, fixed relative to a frame 20, is engaged on the screw threaded drum 10 and the drive shaft 12 is journaled for rotational and reciprocal movement in a pair of bearing blocks 22 and 24, bolted at 25 to the frame 20. Engaged about the pulley drum 10 in the screw threads 26 thereof, are a pair of oppositely extending drive cables 27 and 28.

With further reference to FIG. 1, the drive shaft 12 extends outwardly of the bearing block 22 and has affixed to its outer end a square or otherwise non-round female member 30 of the telescopic coupling 16. Affixed to the distal end of the motor drive shaft 32, is a male member 34 for telescopic driving reception in the female member 30.

Referring to FIG. 2, the screw threads 26 are semicircular in cross section with radii equal to the radii of the cables 27 and 28 passed around the drum 10. The nut 18 is internally threaded with complementary semicircular threads 36 to provide a positive longitudinal drive in either direction to the screw threaded drum 10.

When the screw threaded pulley drum 10 is driven by motor 14 in a given direction, the upper and lower runs 38, 40 and 42, 44 of the respective cables 27 and 28 are driven in opposite directions in the same manner as when applied to conventional pulleys. When the drive to the drum 10 is reversed, the direction of movement of the respective cable runs is likewise reversed.

Each cable 27 and 28 is provided with at least one and one-half turns about the threaded drum 10 as indicated generally at 46 and 48. Because the nut 18 is fixed, the threaded drum 10 travels through the nut at a speed and in a direction as determined by the motor 14 and, therefore, is threaded through the cable turns 46 and 48 in the same direction and at the same speed, the positions of the cable turns remaining constant relative to each other and to the nut 14. Consequently, the cables 27 and 28 remain synchronized at all times with no tendency to shift, slip or travel as is the case with conventional pulley drives.

The respective cable runs 38, 40 and 42, 44 may be directed by any combination of pulleys as indicated generally at 50 and 52 to the object or device which they are intended to move or drive.

What is claimed is:

1. A pulley drive device comprising:
   an elongated pulley drum having screw threads along the working length of its exterior surface;
   a drive shaft extending axially through and fixed to said pulley drum;
   a fixed nut in screw threaded engagement with said pulley drum;
   a reversible motor drive means;
   a telescopic connecting means between said reversible drive means and drive shaft permitting longitudinal, reciprocating movement of said drive shaft and pulley drum;

bearing means to rotatably, reciprocably journal said drive shaft;

cable means passed around said pulley drum in engagement with said screw threads and providing cable runs extending outwardly therefrom for movement in opposite directions when said drum is rotated by said reversible drive means.

2. The device as defined in claim 1 wherein said telescopic connecting means comprises a non-round female member and a complementarily shaped male member for sliding reception within said female member.

3. The device as defined in claim 1 wherein said cable means comprises a pair of cables, said runs therefrom extending outwardly from said pulley drum in generally opposite directions.

4. The device as defined in claim 3 wherein each of said cables is passed around said pulley drum for at least one and one-half turns.

5. The device as defined in claim 1 wherein said reversible drive means comprises an electric motor.

6. The device as defined in claim 1 wherein said screw threads are semi-circular in cross section, having a radius substantially equal to the radius of said cable means.

7. The device as defined in claim 1 wherein said bearing means comprises a pair of bearings, fixed to a frame and spaced outwardly from the respective ends of said pulley drum.

* * * * *